(12) United States Patent
Davis et al.

(10) Patent No.: US 7,136,587 B1
(45) Date of Patent: Nov. 14, 2006

(54) SYSTEM AND METHOD FOR PROVIDING SIMULATED HARDWARE-IN-THE-LOOP TESTING OF WIRELESS COMMUNICATIONS NETWORKS

(75) Inventors: Dennis W. Davis, Eustis, FL (US); Phillip D. Neumiller, New Woodstock, NY (US)

(73) Assignee: MeshNetworks, Inc., Maitland, FL (US)

( * ) Notice: Subject to any disclaimer, the term of this patent is extended or adjusted under 35 U.S.C. 154(b) by 689 days.

(21) Appl. No.: 09/987,674

(22) Filed: Nov. 15, 2001

(51) Int. Cl.
*H04J 14/00* (2006.01)

(52) U.S. Cl. ............................ 398/53; 398/45; 398/52; 398/46; 398/55; 398/115; 398/118; 398/121; 398/125; 398/135; 455/12.1; 455/13.3; 385/16; 385/17; 385/33

(58) Field of Classification Search ................ 398/115, 398/118, 121, 125, 135, 45, 53, 52, 55, 46; 455/12.1, 13.3; 385/16, 17, 33
See application file for complete search history.

(56) References Cited

U.S. PATENT DOCUMENTS

| | | | |
|---|---|---|---|
| 4,494,192 A | 1/1985 | Lew et al. ................ 364/200 |
| 4,617,656 A | 10/1986 | Kobayashi et al. ........... 370/74 |
| 4,633,428 A * | 12/1986 | Byron ........................ 708/835 |
| 4,736,371 A | 4/1988 | Tejima et al. ................. 370/95 |
| 4,742,357 A | 5/1988 | Rackley ..................... 342/457 |
| 4,747,130 A | 5/1988 | Ho ............................. 379/269 |
| 4,910,521 A | 3/1990 | Mellon ....................... 342/45 |
| 5,034,961 A | 7/1991 | Adams ...................... 375/130 |
| 5,037,173 A * | 8/1991 | Sampsell et al. ............ 385/17 |
| 5,068,916 A | 11/1991 | Harrison et al. ............. 455/39 |
| 5,227,906 A * | 7/1993 | Tokumitsu ................... 398/55 |
| 5,231,634 A | 7/1993 | Giles et al. ................ 370/95.1 |

(Continued)

FOREIGN PATENT DOCUMENTS

CA    2132180    3/1996

(Continued)

OTHER PUBLICATIONS

T. Naughton, Z. Javadpour, and J. Keating, entitled "General Purpose Acousto-Optic Connectionist Processor," *Optical Engineering*, vol. 38, No. 7, pp. 1170-1177.

(Continued)

*Primary Examiner*—Hanh Phan
(74) *Attorney, Agent, or Firm*—Randi L. Karpinia; Joseph J. Buczynski

(57) ABSTRACT

A system and method for efficiently and effectively simulating hardware-in-the-loop testing of a wireless communications network. The system and method employs an optical matrix-vector multiplier (MVM) for performing optical signal processing to simulate radio frequency (RF) signal propagation characteristics in a mobile wireless communications network. Specifically, the system and method employs an optical modulator, which is adapted to modulate optical energy with signal energy, such as radio frequency (RF) signal energy, propagating from a first group of transceivers of the network to form a vector of optical signals. The optical matrix-vector multiplier (MVM) receives the vector of optical signals, and has a matrix of optical channel weights which are modifiable in accordance with desired parameters to represent at least on parameter of the wireless network. The optical MVM is further adapted to output signals based on the received vector of optical signals and the optical channel weights. The system and method further employs a detector device, adapted to detect the output signals and to provide the output signals as an output vector of signals to a second group of transceivers of the network.

24 Claims, 6 Drawing Sheets

U.S. PATENT DOCUMENTS

| | | | |
|---|---|---|---|
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,325,224 A * | 6/1994 | Lang et al. | 398/52 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,512,907 A * | 4/1996 | Riza | 342/375 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,240 A * | 10/1997 | Glynn | 398/115 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,798,858 A | 8/1998 | Bodeep et al. | 359/191 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 2001/0053699 A1 | 12/2001 | McCrady et al. | 455/513 |
| 2002/0089720 A1 * | 7/2002 | Steinberg et al. | 359/128 |

FOREIGN PATENT DOCUMENTS

| | | |
|---|---|---|
| EP | 0513841 A2 | 11/1992 |
| EP | 0513841 A3 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

J. Mitchell, M. Nawaz, and C. Pescod, entitled "Evaluation of Multiple Wavelength Mixing Effects in Optical Beamforming Networks," *London Communications Symposium 1999*.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifyiing Dynamic Distributed Multichannel TDMA Slot Assignment Protocol".

Chip Elliott and Bob Heile, "Self-Organizing, Self-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR PROVIDING SIMULATED HARDWARE-IN-THE-LOOP TESTING OF WIRELESS COMMUNICATIONS NETWORKS

BACKGROUND OF THE INVENTION

1. Field of the Invention

The present invention relates to a system and method for providing simulated hardware-in-the-loop testing of a wireless communications network. More particularly, the present invention relates to a system and method which employs an optical matrix-vector multiplier for performing optical signal processing to simulate radio frequency (RF) signal propagation characteristics in a mobile wireless communications network.

2. Description of the Related Art

In recent years, a type of mobile communications network known as an "ad-hoc" network has been developed for use by the military. In this type of network, each user terminal is capable of operating as a base station or router for the other user terminals, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling user terminals to communicate with each other as in a conventional ad-hoc network, provide intelligent access points (IAPs) that enable the user terminals to access a fixed network and thus communicate with other user terminals, such as those on the public switched telephone network (PSTN), and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, and in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, the entire content of both of said patent applications being incorporated herein by reference.

To test a wireless network, such as an ad-hoc wireless network as described above, with modem radio hardware-in-the-loop, it is desirable to provide a testbed that would simulate a deployed network of transceivers in an automated and repeatable fashion. The design and deployment of many kinds of communication networks including cellular, cable, satellite, ad-hoc, and others can benefit from a test capability of this kind. Also, the specific ability to exercise a network of modem or radio transceivers in the presence of a controlled and scripted RF simulation environment would be invaluable.

A conventional method of incorporating RF signal propagation effects and transceiver mobility into the testing of a network has typically involved the use of a small group of test personnel with mobile transceivers. In the case of point-to-point networks, RF switching matrices have been employed without the need for full fanout of the network nodes. However, for systems of greater connectivity, it is usually necessary to exclude the physical layer from network test.

An example of a system having this greater connectivity is an ad-hoc wireless network of the type discussed above. The ad-hoc wireless network comprises a plurality of combined router/IAP devices and subscriber radios, such as mobile user terminals, that are fully connected in the RF sense with a dynamic link attenuation for each path between radios that is under real-time control. Such attenuation models propagation path loss, fading, mobility-induced power changes, and the implementation of power control algorithms which govern adjustment of individual transmitter power levels. A brute force approach to simulating this scenario would involve connecting a population of radios together using a full fan out microwave switching matrix with digitally-controlled attenuation along each path. However, this is generally considered to be a prohibitively expensive technique, the cost of which would be further exacerbated by providing real-time control of path delay.

Accordingly, a need exists for a system and method capable of performing simulation testing on a communications network, such as an ad-hoc communications network, with minimal complexity and cost.

SUMMARY OF THE INVENTION

An object of the present invention is to provide a system and method for efficiently and effectively simulating hardware-in-the-loop testing of a wireless communications network.

Another object of the present invention is to provide a system and method which employs an optical matrix-vector multiplier for performing optical signal processing to simulate radio frequency (RF) signal propagation characteristics in a mobile wireless communications network.

These and other objects of the present invention are substantially achieved by providing a system and method for testing a wireless network of transceivers. The system and method employ an optical modulator, adapted to modulate optical energy with signal energy, such as radio frequency (RF) signal energy, propagating from a first group of transceivers of the network to form a vector of optical signals. The system and method further employs an optical matrix-vector multiplier (MVM), which is adapted to receive the vector of optical signals. The optical MVM has a matrix of optical channel weights which are modifiable in accordance with desired parameters to represent at least on parameter of the wireless network. The optical MVM is further adapted to output signals based on the received vector of optical signals and the optical channel weights. The system and method further employ a detector device, adapted to detect the output signals and to provide the output signals as an output vector of signals to a second group of transceivers of the network. The detector device can include an amplifier device, which is adapted to amplify the output signals to create the output vector of signals. The optical modulator can be adapted to modulate the optical energy at a plurality of different optical wavelengths, to enable full duplex communication simulation of the network. Furthermore, the matrix of optical weights can be replicated in order to provide a reciprocal transmission path between each transceiver of the network, and to increase the dimension of the input and output vectors to represent transceivers for the reciprocal transmission paths, to enable full duplex communication simulation of the network.

The system and method can further employ a delay device, adapted to impose respective delays on each of the output signals before the output signals are received by the detector device. The delay device can include an array of delay devices, each configured to impose a respective delay on a respective one of the output signals. The system and method can also employ a first lens system, adapted to direct the vector of optical signals onto the optical MVM, such that each respective component of the vector of optical signals is directed onto a respective row of the optical channel weights of the optical MVM. In addition, the system and method can employ a second lens system, adapted to direct the output signals from the optical MVM onto the detector device, such that the output signals from rows of the optical channel weights of the optical MVM onto a row of detectors of the detector device.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

A simple example of the topology of a network, such as an ad-hoc packet-switched communications network of the type described above, is depicted in FIGS. 1a and 1b. As indicated, the network in this example comprises three subscribers, $S_1$ through $S_3$, and three routers, $R_1$ through $R_3$. The subscriber $S_1$ through $S_3$ can be any type of wireless user terminal which can be capable of receiving and transmitting any type of communications signals, such as voice, data or multimedia. The routers $R_1$ through $R_3$ can be subscriber terminals in the ad-hoc network that are capable of acting as routers, or combined router/IAP devices as described above.

Figure 1A:
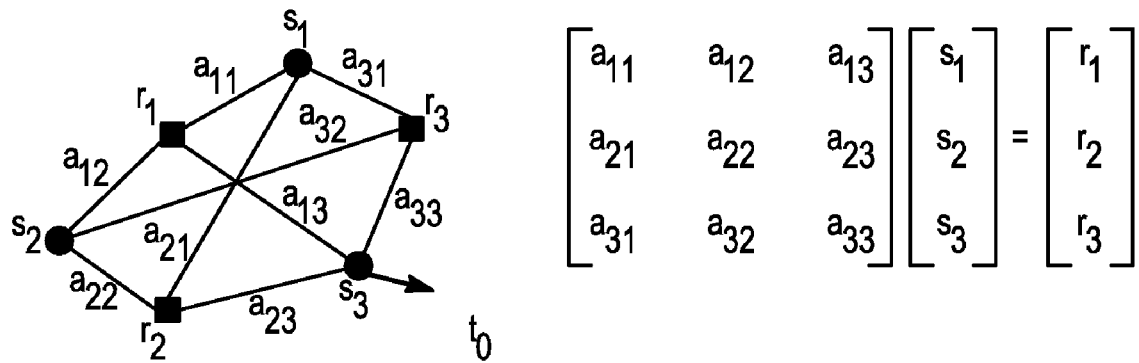
FIGS. 1a and 1b are diagrammatic views illustrating an example of a network, such as an ad-hoc communications network, that can be tested by an embodiment of the present invention.
Figure 1B:
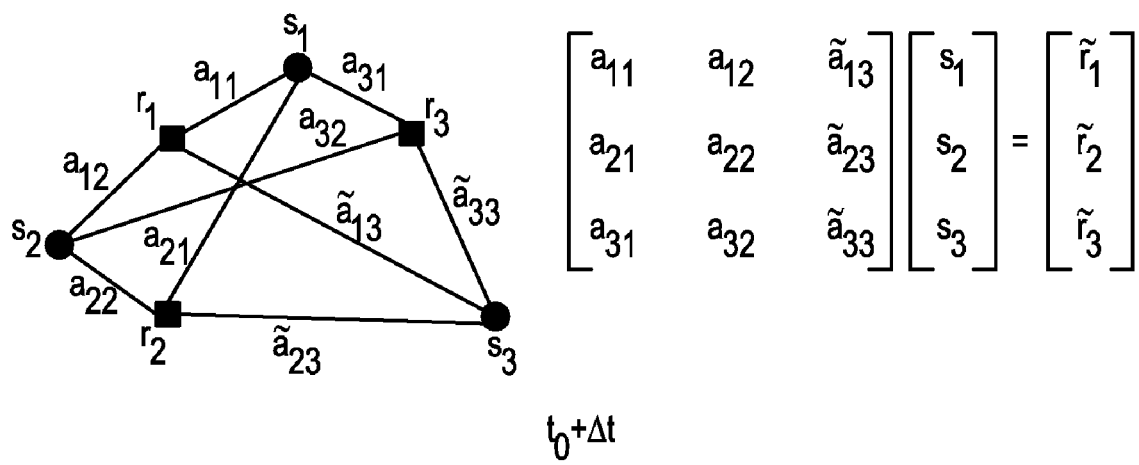

FIG. 1a represents an initial relative geometry between the subscribers $S_1$ through $S_3$ and routers $R_1$ through $R_3$. In the corresponding matrix equation, the vectors containing lower case s represent the respective powers of the signals transmitted by each subscriber $S_1$ through $S_3$, and the vectors containing the lower case r represent the respective powers of the signals received by each router $R_1$ through $R_3$. FIG. 1b, on the other hand, represents the network geometry after some lapse in time $\Delta t$ during which subscriber $S_3$ has moved to the right. The corresponding alteration in power received at each router $R_1$ through $R_3$ from this subscriber $S_3$ is denoted by the matrix entries having a tilda. Accordingly, the evolution of network topology due to movement of one or more of the subscribers $S_1$ through $S_3$, or due to other circumstances that can cause path loss variations, can be implemented by updating the weight matrix.

Figure 2:
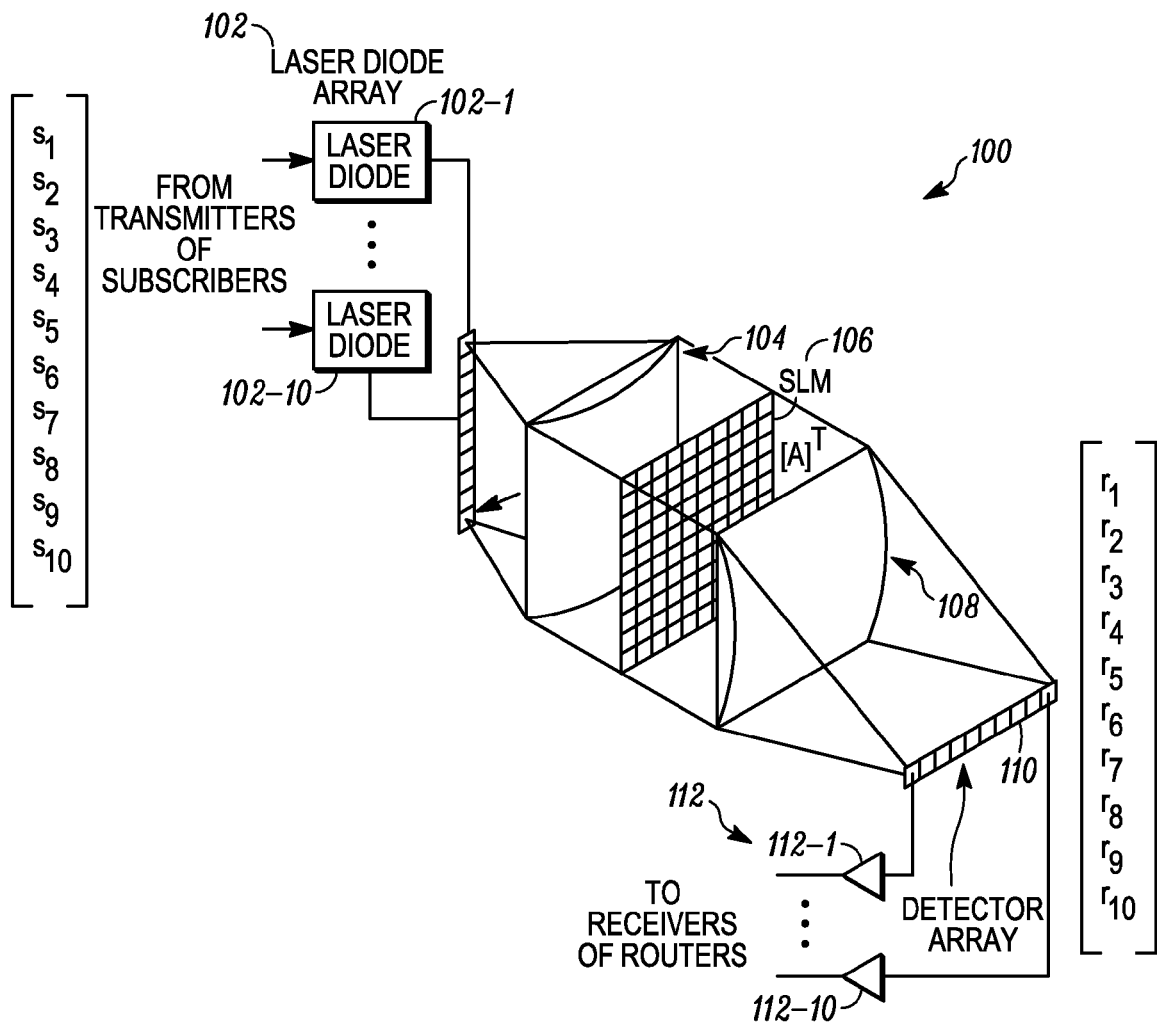
FIG. 2 is a block diagram illustrating an example of a system for simulating hardware-in-the-loop testing of a network as shown in FIG. 1, according to an embodiment of the present invention.

FIG. 2 illustrates an example of a system 100 for simulating network topology and its variations as shown in FIGS. 1a and 1b. More particularly, system 100 is capable of achieving dynamic amplitude weighting of RF signals to represent RF propagation effects in the testing of radio modem networks, such as ad-hoc networks as described above.

Figure 3:
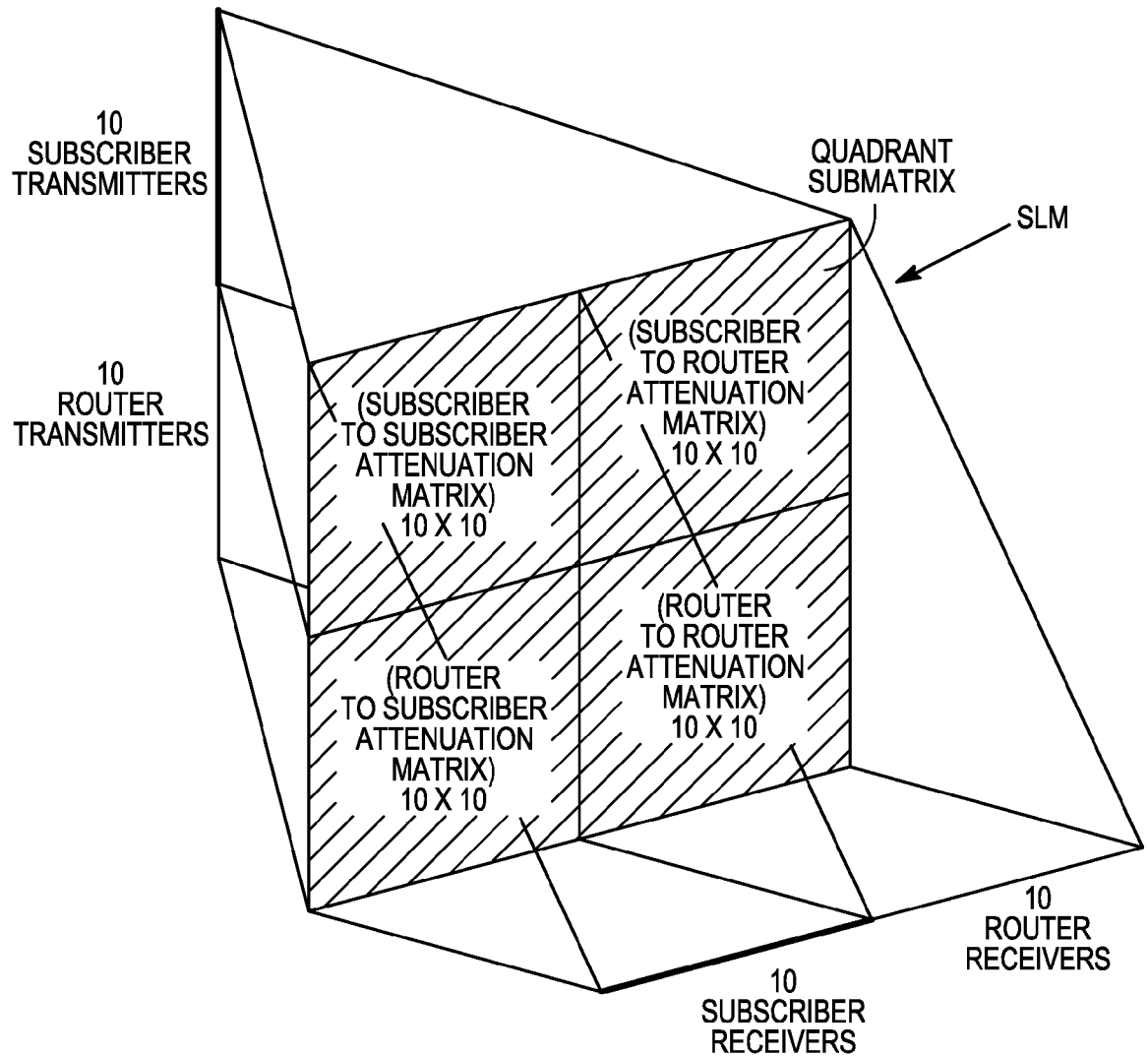
FIG. 3 is a detailed view of a modification to a component of the system shown in FIG. 2 according to an embodiment of the present invention.

As shown, the system 100 includes a laser diode array 102 comprising a plurality of laser diodes, a first cylindrical lens 104, a spatial light modulator (SLM) configured as a matrix vector multiplier (MVM) 106, a second cylindrical lens 108, a detector array 110, and amplifiers 112. In this example, the MVM 106 is a 10×10 array representing ten subscribers $S_1$ through $S_{10}$ and ten routers $R_1$ through $R_{10}$ of a network, although a useful number of transceivers for system level tests can number 20 or more. It can be also noted that if the number of subscribers is different than the number of routers, the MVM 106 would be rectangular rather than square. Furthermore to represent a system with full connectivity, meaning that all routers and subscribers talk to each other, the input vector would double in length and MVM 106 would thus double along each dimension, as depicted in FIG. 3 which is discussed in more detail below. In this way, connectivity is added to allow subscriber to subscriber communication and router to router communication.

The MVM 106 can be an optical matrix-vector multiplier (MVM). Optical MVMs have been in existence for more than 20 years as one of a number of basic optical computing building blocks. Various MVM implementations have been achieved using either spatial light modulators (SLMs), acousto-optic modulators, electro-optic modulators, or combinations of these. Types of acoustic-optic modulators are described in a publication by T. Naughton, Z. Javadpour, and J. Keating, entitled "General Purpose Acousto-Optic Connectionist Processor," *Optical Engineering*, Vol. 38, No. 7, pp. 1170–1177, and in a publication by Z. Qida, H. Shiya, and Y. Kuanxin, entitled "The Theoretical and Experimental Study of Two-Dimensional Multichannel Acousto-Optic Interaction," *Acta Optica Sinica*, Vol. 20, No. 10, pp. 1396–1402, October 2000, the entire contents of both of these documents are incorporated herein by reference.

As can be appreciated by one skilled in the art, SLMs are devices that typically are configured as a two-dimensional array of pixel light modulators. Either the transmissivity or reflectivity (or phase shift) of the pixel can be modified by electrical or optical addressing and control of individual pixel behavior. Early SLMs took the form of LCD displays used to spatially modulate optical wavefronts at relatively low framing rates. Acousto-optic MVMs that perform multiplications optically with digital number representations, and thus have improved numerical accuracy over analog multipliers, have been reduced to practice in recent years. Also, micromirror SLMs can be used in either a binary or analog modulation mode. Because of the small size of individual tilt mirror pixels, macro pixels comprising arrays of these smaller pixels can provide quantized gray scale modulation by virtue of the percentage of such micro pixels within a macro pixel that are "turned on." The low inertia of micromirror pixels allows pixel switching times on the order of tens of microseconds. Because the system 100 according to an embodiment of the present invention is intended to preserve RF subcarrier information and to perform continuous computation, the MVM will assume the form of an analog multiplier as will be discussed in more detail below.

Further, a space integrating MVM architecture is preferable for real-time simulation of the network exchange of RF information, as opposed to a time integrating MVM architecture such as a fiber optic implementation as described in a publication by V. A. Pilipovich, A. K. Esman, I. A. Goncharenko, V. S. Posedko, and I. F. Solonovich entitled "Controlled Optical Fiber Processor for Matrix/Vector Multiplication," *SPIE Vol. 2969, Second International Conference on Optical Information Processing*, pp. 125–128, December 1996, the entire contents of which is incorporated herein by reference.

As further shown in FIG. 2, the RF signal from each subscriber radio $S_1$ through $S_{10}$ is used to amplitude modulate light radiated from a respective laser diode 102-1 through 102-2. That is, each modem transmitter output is coupled to a laser diode 102-1 through 102-10, respectively, with a large amplitude modulation bandwidth. At present, 15 GHz bandwidth is a current maximum commercially available using fiber-pigtailed Fabry-Perot cavity diodes from Agere Systems (previously Ortel) having 50 ohm RF input. The light from each such transmitter is configured in space to represent the input vector to the optical MVM 106. An alternative to the use of directly modulated laser diodes is the use of continuous wave, non-modulated laser diodes in concert with external modulators. An example of analog, external modulators are those produced by JDS Fitel. These devices are typically integrated optical waveguide modulators rendered in lithium niobate substrates and capable of modulation up to 18 GHz.

Specifically, the light from each such diode 102-1 through 102-10 is collimated for projection across a corresponding row of SLM pixels of MVM 106 by a first cylindrical lens 104. Alternatively, a diffractive optical element can be used to convert the beam into N parallel beamlets. Furthermore, the SLM MVM 106 is pictorially represented as a transmission mode device, but could be implemented as a reflection mode device as discussed in more detail below with respect to FIG. 4. Each pixel (i.e., matrix element) attenuates the light according to the value designated by real-time control. Such control can be achieved either with electronic or separate optical addressing.

The matrix of weights imparted by the SLM MVM 106 is under processor control and is alterable at some maximum framing rate limited by SLM device technology. The current state of the art for arrays of greater than 256×256 pixels is for framing rates approaching 1 MHz using multiple quantum well (MQW) devices which exploit electrically-alterable Franz-Keldysh absorption spectra. Lockheed Sanders, now a division of BAE, has produced such a device, as described in a publication by Brian K. Jones and James C. Kirsch, entitled "Evaluation of a Multiple Quantum Well SLM," *Proc. SPIE Vol. 4043, Optical Pattern Recognition XI*, pp. 72–79, 2000, the entire contents of which is incorporated herein by reference. However, the limited size of the geometry (20×20 pixels) of the MVM 106 may allow use of the device at beyond 1 MHz frame rates. For example, 16×16 flip chip bonded arrays with framing rates of 2 MHz have been produced by research teams at the Univ. of Ca. at San Diego. Other types of high-speed SLMs are described in a publication by J. A. Trezza, K. Kang, J. S. Powell, C. G. Garvin, and R. D. Stack, entitled "High-speed Electrically Controlled GaAs Quantum Well Spatial Light Modulators: Device Creation and Applications," *SPIE Vol. 3292*, pp. 94–102, 1998, the entire contents of which is incorporated herein by reference.

In the system 100 shown in FIG. 2, a 1 microsecond SLM switching time is a favorable duration relative to the time scale of messaging packets present on the RF subcarrier. Furthermore, megahertz switching rates allow incorporation of high fidelity, high speed mobility effects. A 40 dB dynamic range in the power of a received RF signal will be a useful span for simulation of fading and power control. Commercially available ferroelectric liquid crystal SLMs offer as much as 8-bits of dynamic range in reflectivity (or transmissivity), which corresponds to 48 dB variation in optical power and hence, detected RF power.

The matrix weights for MVM 106 can be generated either online or offline. If online, a realtime simulation of a network of fixed and mobile transceivers computes distance-dependent path loss, gain control, fading and other contributions to each matrix element. The simulation values for the weight matrix can be repetitively downloaded to the SLM MVM 106. Alternatively, a scripted scenario for the simulation can be executed offline to generate a time sequence of matrices that can then be downloaded from memory into the testbed at a framing rate that corresponds to real time evolution of the scenario.

Accordingly, in a common configuration for the MVM 106 as discussed above, an SLM is used to implement the matrix of real-time amplitude weights for laser light emitted from each diode and hence, for each associated RF subcarrier, along each RF path modeled. Spatial integration of the light from all subscriber paths to a single router or, in other words, the superposition of all subscriber radiation at a single router, is achieved by the second cylindrical lens 108 that collapses the light from each column of pixels onto a single, respective detector 110-1 through 110-10 of detector array 110. The RF energy detected in this manner for each router $R_1$ through $R_{10}$ is then amplified by a respective amplifier 112-1 through 112-10 for input to the respective router modem receiver. Hence, an array of such optical detectors is configured in space to represent the resulting output vector. The effective noise figure for this process is minimized by achieving narrowband (e.g., 3% bandwidth) impedance matching at the outputs of the optical detectors of detector array 110.

As can be appreciated from the above, system 100 shown in FIG. 2 has half duplex functionality. With reference to FIG. 2, this means that paths are represented for transmission from subscriber to router but not in the other direction. There are different ways to partition the SLM to represent forward and reverse transmission paths. A straight-forward partitioning is presented in FIG. 3. The geometry of FIG. 3 provides for two-way (full duplex) transmission from subscribers to routers by providing intra-class full duplex transmission paths in each quadrant submatrix of the SLM. Here the classes of connectivity comprise router-to-router, subscriber-to-subscriber, router-to-subscriber, and subscriber-to-router. In the most general implementation, one can represent the full duplex communication among N transceivers by representing all possible (full connectivity and full duplex) transmission paths by an N×N attenuation matrix using an SLM.

Figure 4:
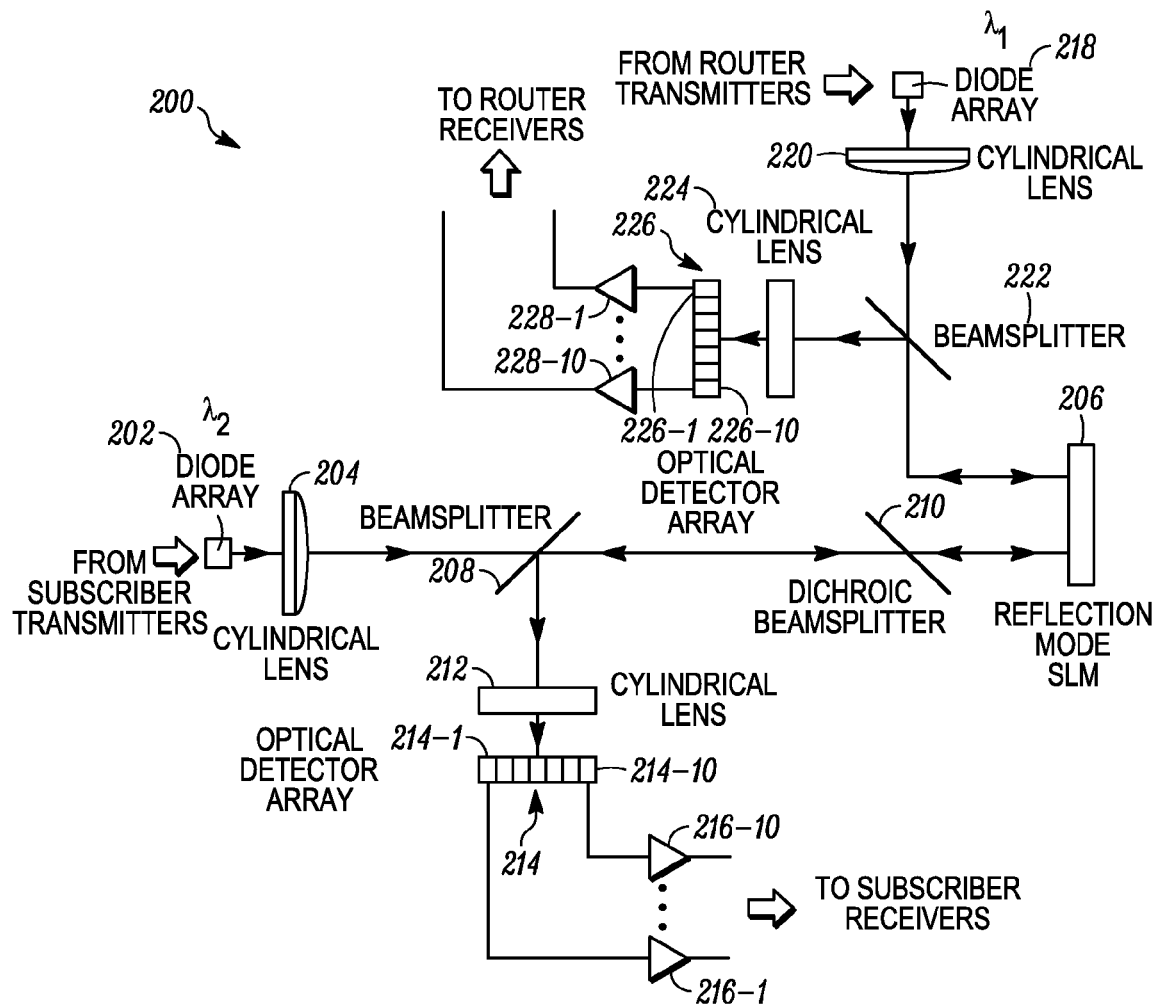
FIG. 4 is a block diagram illustrating another example of a system for simulating hardware-in-the-loop testing of a network as shown in FIG. 1, according to another embodiment of the present invention.

As shown in FIG. 4, the system 100 described above can be modified using an MVM operating as a reflection mode device, along with wavelength selective beam train elements such as dichroic mirrors or beamsplitters, so that the simulated forward and reverse RF paths are implemented at two different wavelengths. That is, the system 200 shown in FIG. 4 includes a diode array 202, which is similar to diode array 102 and receives RF signals from the subscriber transmitters as described above. The system 200 also includes a first cylindrical lens 204 similar to first cylindrical lens 104 described above, which collimates the light from each of the diodes of diode array 202.

The system 200 further includes an SLM MVM 206 operating in a reflection mode. The light from diode array 202 that has been collimated by first cylindrical lens 204 passes through beamsplitter 208 and dichroic beamsplitter 210 and propagates onto the reflection mode SLM MVM 206 in a manner similar to that in which the light from diode array 102 is propagated onto SLM MVM 106 as shown in FIG. 2 as described above. The light reflected from SLM MVM 206 in response to this incident light passes through dichroic beamsplitter 210 and is reflected by beamsplitter 208 to pass through a cylindrical lens 212. Cylindrical lens 212 collapses the light from each column of pixels onto a single, respective detector 214-1 through 214-10 of detector array 214 in a manner similar to that described above with respect to cylindrical lens 108 and detector array 110 shown in FIG. 2. The RF energy detected in this manner for a receiver of each subscriber $S_1$ through $S_{10}$ is then amplified by a respective amplifier 216-1 through 216-10 for input to the respective subscriber modem receiver.

In addition, system 200 includes another diode array 218, which is similar to diode array 102 and receives RF signals from the transmitters of routers $R_1$ through $R_{10}$. The system 200 also includes a cylindrical lens 220 similar to first cylindrical lens 104 described above, which collimates the light from each of the diodes of diode array 218.

The light from diode array 218 that has been collimated by cylindrical lens 220 passes through beamsplitter 222, is reflected by dichroic beamsplitter 210 and propagates onto the reflection mode SLM MVM 206 in a manner similar to that in which the light from diode array 102 is propagated onto SLM MVM 106 as shown in FIG. 2 as described above. The light reflected from SLM MVM 206 in response to this incident light is reflected by dichroic beamsplitter 210 and is reflected by beamsplitter 222 to pass through a cylindrical lens 224. Cylindrical lens 224 collapses the light from each column of pixels onto a single, respective detector 226-1 through 226-10 of detector array 226 in a manner similar to that described above with respect to cylindrical lens 108 and detector array 110 shown in FIG. 2. The RF energy detected in this manner for a receiver of each router $R_1$ through $R_{10}$ is then amplified by a respective amplifier 228-1 through 228-10 for input to the respective router modem receiver.

The chief benefit of the layout of FIG. 4 over that represented in FIG. 3 is that an SLM of dimension supporting half duplex communication can be used to achieve full duplex communication. This is accomplished by representing forward communication along all paths using a first optical wavelength and representing reverse communication along all paths with a second optical wavelength. Also, other information can be passed over these simulated transmission paths as additional wavelengths are used. Such information might include reference data for ongoing calibration of the test bed, or other ancillary information useful to the test functionality.

Figure 5:
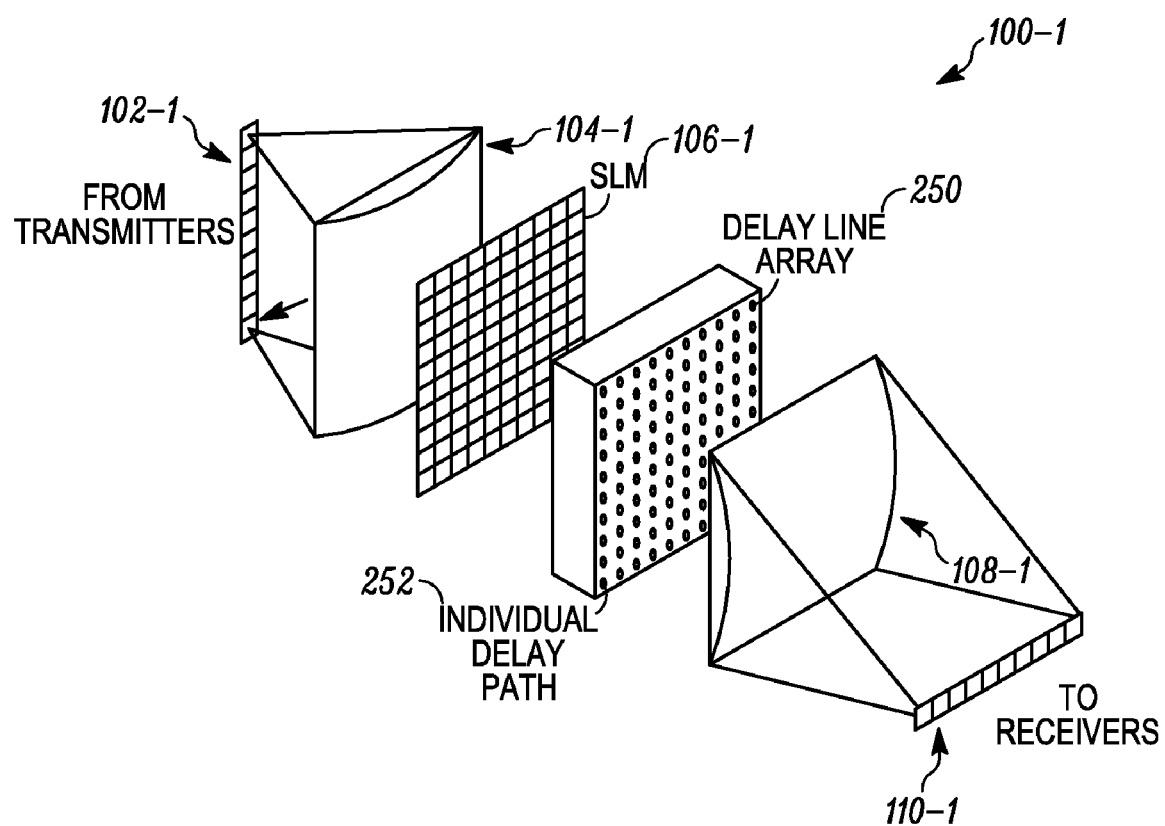
FIG. 5 is a block diagram illustrating an example of a system as shown in FIG. 2 which has been modified to include a delay line array according to an embodiment of the present invention.

Secondary embodiments of the invention include the ability to effect RF carrier phase shifts as well as long variable delays for modeling RF propagation delay along each transmitter-to-receiver path in the network under test. FIG. 5 depicts the use of multichannel optical delay line array 250 incorporated in the embodiment of the present invention shown in FIG. 2. Accordingly, the system and its components which are similar or identical to those included in the system 100 shown in FIG. 2 are represented by the prefix "−1" and will not be discussed in detail here.

As indicated, the multichannel optical delay line array 250 includes a plurality of individual delay paths 252 that each impose a respective delay on the light propagating from a respective element of SLM 106-1. In this example, the delay line array 250 is depicted as a 10×10 array because SLM 106-1 is a 10×10 array. It should also be noted that the delay line array 250 shown in the FIG. 5 is a functional depiction and not representative of a practical reduction to practice, as will be described below. Long variable delays in the real channel propagation path are the result of distances between transceivers and the multipath that occurs. As an example, propagation at a carrier frequency of 2.4 GHz suggests the time associated with long delays versus carrier phase shift delays will be several microseconds versus nanoseconds (and fractions of a nanosecond), respectively. This is based on the mean anticipated transceiver separations at this frequency band. Given that light propagates at approximately one foot per nanosecond, microsecond-range delay lines are conventionally implemented using fiber optical delay lines. Such fiber delay lines may be continuously-variable over certain delay regimes by use of wavelength dispersion tuning or temperature tuning of delay in the fibers.

Figure 6A:
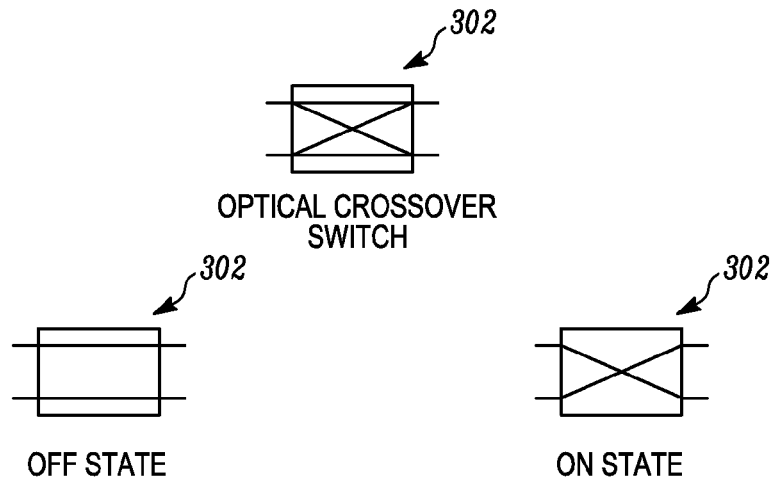
FIGS. 6a and 6b are conceptual diagrams illustrating examples of an optical crossover switch and its employment in a delay line circuit for use with the system shown in FIG. 5 according to an embodiment of the present invention.
Figure 6B:
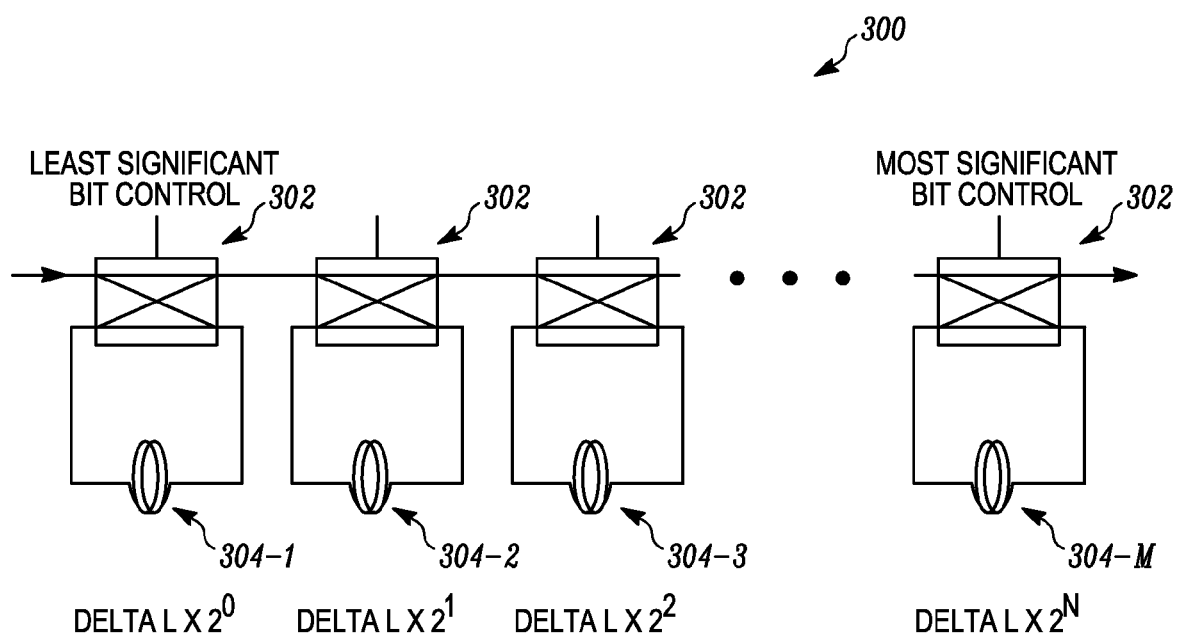

Alternatively, digital fiber delay lines can be used to provide switchable, incremental delay values. FIGS. 6a and 6b depict the implementation of an N-bit digital optical delay line 300. A key element is the optical crossover switch 302, whose functionality is shown in FIG. 6a. Specifically, FIG. 6a indicates the manner in which the two input ports on the left of the switch are connected to the two output ports on the right of the switch in each of the switch states (i.e., "off" or "on" states). It may be discerned from FIG. 6b that N different increasing lengths (modulo 2) of fiber 304-1 through 304-n can be switched into or out of the signal path to provide a delay line with $2^N$ selectable delays ranging from zero to $(2^N-1)\times$(delta L). Accordingly, the delay line array 250 shown in FIG. 5 can be configured such that each individual delay path 252 includes a circuit as shown in FIG. 6b, which is arranged to receive light propagating from a respective element of SLM 106-1 and thus can be controlled by a controller (not shown) to impose a respective delay on that light. Clearly, large numbers of fiber optical delay lines may be cumbersome to incorporate and this approach is more generally useful for simulation of small numbers of transmission paths.

Carrier phase shifts are due to delay variations on a fine time scale as well as distortions in the channel and hardware under test. These delays, on the order of subnanoseconds, are easier to implement either by short fiber channel delays with materials having alterable indices of refraction, or with compact total internal reflection methods, as are well known in the art.

It can be further noted that the systems shown in FIGS. 2–6 discussed above include certain sources of error that should quantified and mitigated in order to enhance the operability of the systems. These primary error sources include phenomena that can be referred to as speckle, a spatially-interferometric effect, optical beating interference (OBI) due to mixing of multiple optical carriers and associated sidebands into the RF band of interest, and optical crosstalk due to beamspread of laser diode energy into an adjacent spatial channel (i.e., adjacent spatial light modulator pixel).

Speckle interference can be caused by the destructive interference generated by wavefront multipath. Speckle interference associated with a given laser diode can be quantified in terms of the mean speckle size which is dictated by the optical geometry. The impact of speckle can be limited with an optical layout that exhibits a mean speckle size larger than the optical detector. Alternatively, spatial averaging a multiplicity of speckles much smaller than the detector size can be achieved on a single detector.

OBI occurs when two or more laser transmitters with nearly the same wavelength are received simultaneously by a photodetector. A typical wideband detector is a p-i-n photodiode which is a square law detector. When N independent, un-correlated light sources, each of average power P are incident on a photodiode, the received signal can be described as:

$$E(t) = \sum_{k=1}^{N} \rho_k \sqrt{P_k m_k(t)} \exp j[\omega_k t + \phi_k(t)]$$

where $\rho$ is the polarization state, $\omega$ is the optical frequency, $\phi(t)$ the optical phase and $m(t)$ the modulation applied to the optical carrier.

When this summation of electric fields falls upon such a square law photodetector having responsivity R, the received photocurrent is:

$$i(t) = R\left[\sum_{k=1}^{N} P_k m_k(t) + 2\text{Re}\left(\sum_{k=1}^{N-1}\sum_{i=k+1}^{N} \sqrt{P_k P_i m_k(t) m_i(t)} \cos[(\omega_k - \omega_i)t + \phi_k(t) - \phi_i(t)]\right)\right]$$

where Re denotes real component. To avoid the appearance of mixer products which are inband to the RF modulation, either the optical carriers should be sufficiently separated in wavelength or the coherence of the optical carriers should be significantly diminished, as described in a publication by J. Mitchell, M. Nawaz, and C. Pescod, entitled "Evaluation of Multiple Wavelength Mixing Effects in Optical Beamforming Networks," *London Communications Symposium* 1999, the entire contents of which is incorporated herein by reference.

In the systems described above, exhibiting 4 equally-spaced RF subcarriers within the $2^{nd}$ ISM band, a separation of 0.06 nm (7.5 GHz @ 1550 nm) between the wavelengths of laser diodes is sufficient to avoid OBI and allow concurrent non-interfering direct detection of multiple diode signals on a single optical detector (i.e., optical summation in the matrix-vector multiplier). Diodes can be hand selected at the factory to provide as much as a nominal 1 nm wavelength separation. Alternatively, laser diodes can be temperature tuned or drive current-biased to provide wavelength diversity. Typical laser diodes exhibit 0.2 to 0.5 nm/° C. temperature tunability. Furthermore, an example technique using frequency modulation (FM) of the optical carrier for ameliorating optical coherence is described in U.S. Pat. No. 5,798,858, the entire contents of which is incorporated herein by reference. Additionally, broad optical spectral width (with the attending loss of coherence) is achievable by use of superluminescent laser diodes or LEDs in concert with external modulators.

In the matrix-vector multiplier architecture, sidelobes in the optical beam of a laser diode, as well as scattering and diffraction of light will occur leading to spatial channel crosstalk. The use of commercially-available computer-generated holograms (CGHs) or diffractive optical elements (DOEs) can be used to precisely map laser diode beams into individual channel beamlets with negligible crosstalk, as described in a publication by David Casasent and Daming Yu, "One-dimensional collimation of laser array outputs," *Applied Optics*, Vol. 33., No. 14, 10 May 1994, pp. 3118–3126, the entire contents of which is incorporated herein by reference.

As can be appreciated from the above, the systems shown in FIGS. 2–6 mathematically achieve the desired amplitude-weighting of transmitter power levels along each path to each respective receiver by performing a matrix-vector multiplication. In this formulation, a matrix of path amplitude weights multiplies the vector of transmitter power levels to obtain a vector of received power levels. As demonstrated, this dynamic weighting can be implemented in an architecture of modest cost that, by virtue of its parallelism, scales very well with the number of radios comprising the network under test.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A system for testing a wireless network of transceivers, comprising:
   an optical modulator, adapted to modulate optical energy with signal energy propagating from a first group of said transceivers of said network to form a vector of optical signals;
   an optical matrix-vector multiplier (MVM), adapted to receive said vector of optical signals, and having a matrix of optical channel weights which are modifiable in accordance with desired parameters to simulate at least one parameter of said wireless network, said optical MVM being further adapted to output signals based on said received vector of optical signals and said optical channel weights;
   a detector device, adapted to detect said output signals and to provide said output signals as an output vector of signals to a second group of transceivers of said network; and
   a delay device, adapted to impose respective delays on each of said output signals before said output signals are received by said detector device.

2. A system as claimed in claim 1, wherein:
   said detector device includes an amplifier device, adapted to amplify said output signals to create said output vector of signals.

3. A system as claimed in claim 1, wherein:
   said signal energy includes radio frequency (RF) signal energy and said output signals include RF signals.

4. A system as claimed in claim 1, wherein:
   said optical modulator is adapted to modulate said optical energy at a plurality of different optical wavelengths, to enable full duplex communication simulation of said network.

5. A system as claimed in claim 1, wherein:
   said matrix of optical channel weights is replicated in order to provide a reciprocal transmission path between each said transceiver of said network, and to increase the dimension of said input and output vectors to represent transceivers for said reciprocal transmission paths, to enable full duplex communication simulation of said network.

6. A system as claimed in claim 1, wherein:
said optical modulator includes a plurality of optical detectors, each adapted to receive respective said signal energy from a respective one of said transceivers in said first group.

7. A system as claimed in claim 1, wherein:
said detector device includes a plurality of detectors, each adapted to receive a respective said output signal.

8. A system as claimed in claim 1, wherein:
said delay device includes an array of delay devices, each configured to impose a respective delay on a respective one of said output signals.

9. A system as claimed in claim 1, further comprising:
a first lens system, adapted to direct said vector of optical signals onto said optical MVM.

10. A system as claimed in claim 9, wherein:
said first lens system is adapted to direct each respective component of said vector of optical signals onto a respective row of said optical channel weights of said optical MVM.

11. A system as claimed in claim 1, further comprising:
a second lens system, adapted to direct said output signals from said optical MVM onto said detector device.

12. A system as claimed in claim 11, wherein:
said second lens system is adapted to direct said output signals from rows of said optical channel weights of said optical MVM onto a row of detectors of said detector device.

13. A method for testing a wireless network of transceivers, comprising:
modulating optical energy with signal energy propagating from a first group of said transceivers of said network to form a vector of optical signals;
receiving said vector of optical signals at an optical matrix-vector multiplier (MVM) having a matrix of optical channel weights which are modifiable in accordance with desired parameters to simulate at least one parameter of said wireless network;
outputting output signals from said optical MVM based on said received vector of optical signals and said optical channel weights;
detecting said output signals and to provide said output signals as an output vector of signals to a second group of transceivers of said network; and
imposing respective delays on each of said output signals before said output signals are detected by said detecting.

14. A method as claimed in claim 13, wherein:
said detector device includes an amplifier device; and
said method includes controlling said amplifier device to amplify said output signals to create said output vector of signals.

15. A method as claimed in claim 13, wherein:
said signal energy includes radio frequency (RF) signal energy and said output signals include RF signals.

16. A method as claimed in claim 13, wherein:
said modulating modulates said optical energy at a plurality of different optical wavelengths, to enable full duplex communication simulation of said network.

17. A method as claimed in claim 13, wherein:
said receiving includes replicating said matrix of optical channel weights in order to provide a reciprocal transmission path between each said transceiver of said network, and to increase the dimension of said input and output vectors to represent transceivers for said reciprocal transmission paths, to enable full duplex communication simulation of said network.

18. A method as claimed in claim 13, wherein:
said modulating includes receiving, at each of a plurality of optical detectors, respective said signal energy from a respective one of said transceivers in said first group.

19. A method as claimed in claim 13, wherein:
said detecting includes receiving, at each of a plurality of detectors, a respective said output signal.

20. A method as claimed in claim 13, wherein:
said delay imposing includes using each of an array of delay devices to impose a respective delay on a respective one of said output signals.

21. A method as claimed in claim 13, further comprising:
directing said vector of optical signals through a first lens system onto said optical MVM.

22. A method as claimed in claim 21, wherein:
said first lens system is adapted to direct each respective component of said vector of optical signals onto a respective row of said optical channel weights of said optical MVM.

23. A method as claimed in claim 13, further comprising:
direct said output signals from said optical MVM through a second lens system onto a detector device which is adapted to perform said detecting.

24. A method as claimed in claim 23, wherein:
said second lens system is adapted to direct said output signals from rows of said optical channel weights of said optical MVM onto a row of detectors of said detector device.

* * * * *